(12) United States Patent
Dickerson et al.

(10) Patent No.: US 10,558,353 B2
(45) Date of Patent: Feb. 11, 2020

(54) SYSTEM AND METHOD FOR 360-DEGREE VIDEO NAVIGATION

(71) Applicant: Samsung Electronics Co., Ltd, Suwon-si (KR)

(72) Inventors: Andrew J. Dickerson, Allen, TX (US); Nick Antonelli, Germantown, TN (US); Jeff Wilkinson, Flower Mound, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 15/213,264

(22) Filed: Jul. 18, 2016

(65) Prior Publication Data

US 2017/0139578 A1    May 18, 2017

Related U.S. Application Data

(60) Provisional application No. 62/257,142, filed on Nov. 18, 2015.

(51) Int. Cl.
*G06F 3/0484* (2013.01)
*G11B 27/34* (2006.01)
(Continued)

(52) U.S. Cl.
CPC ........ *G06F 3/04883* (2013.01); *G06F 3/0488* (2013.01); *G06F 3/04815* (2013.01);
(Continued)

(58) Field of Classification Search
CPC ............ G06F 3/04883; G06F 3/04845; G06F 3/04847; G06F 3/04815; G06F 3/0488;
(Continued)

(56) References Cited

U.S. PATENT DOCUMENTS 7,768,545 B2   8/2010   Glatt
8,044,992 B2   10/2011   Kurebayashi et al.
(Continued)

FOREIGN PATENT DOCUMENTS

WO   WO 2013/109052   7/2013

OTHER PUBLICATIONS

Google Earth Flight Simulator; Learn to read the flight display panel—Earth Help; https://support.google.com/earth/answer/148091?hl=en&reftopic=4386088; acessed on Nov. 24, 2015; 3 pages.
(Continued)

*Primary Examiner* — Tan H Tran (57) ABSTRACT

A method is provided for navigating a 360-degree video. The method includes displaying a portion of the 360-degree video on a display. The method also includes displaying a graphical indicator overlaid on the 360-degree video. The graphical indicator represents a plurality of viewing directions within the 360-degree video. The graphical indicator includes at least one marker identifying a first viewing direction corresponding to the portion of the 360-degree video. The method also includes receiving an input at a position along the graphical indicator corresponding to a second viewing direction. The method also includes displaying another portion of the 360-degree video on the display, the other portion corresponding to the second viewing direction.

17 Claims, 5 Drawing Sheets

(51) Int. Cl.
*H04N 5/232* (2006.01)
*G06F 3/0488* (2013.01)
*H04N 21/472* (2011.01)
*H04N 21/431* (2011.01)
*H04N 21/81* (2011.01)
*G06F 3/0481* (2013.01)
*H04N 5/445* (2011.01)

(52) U.S. Cl.
CPC ... *H04N 21/4312* (2013.01); *H04N 21/47217* (2013.01); *H04N 21/816* (2013.01); *H04N 5/23238* (2013.01); *H04N 5/445* (2013.01)

(58) Field of Classification Search
CPC ............... G11B 27/34; H04N 21/4312; H04N 21/47217; H04N 21/816; H04N 5/23238; H04N 5/445
See application file for complete search history.

(56) References Cited

U.S. PATENT DOCUMENTS

| | | | |
|---|---|---|---|
| 9,015,013 B2 | 4/2015 | Ivchenko et al. | |
| 9,020,239 B2 | 4/2015 | Graepel | |
| 9,094,655 B2 | 7/2015 | Suzuki | |
| 9,167,156 B2 | 10/2015 | Han et al. | |
| 9,175,975 B2 | 11/2015 | Shtukater | |
| 9,189,884 B2 | 11/2015 | Gharpure et al. | |
| 9,824,723 B1* | 11/2017 | Bentley | G11B 27/3081 |
| 2010/0162150 A1 | 6/2010 | O'Mullan et al. | |
| 2010/0231687 A1 | 9/2010 | Amory et al. | |
| 2010/0299630 A1* | 11/2010 | McCutchen | H04N 7/18 |
| | | | 715/803 |
| 2012/0038681 A1* | 2/2012 | Summers | G06F 3/04883 |
| | | | 345/684 |
| 2012/0090010 A1 | 4/2012 | Dace et al. | |
| 2012/0159391 A1 | 6/2012 | Berry et al. | |
| 2012/0327185 A1 | 12/2012 | Steuart, III | |
| 2014/0129990 A1* | 5/2014 | Xin | G06F 3/017 |
| | | | 715/849 |
| 2014/0176542 A1* | 6/2014 | Shohara | G06T 15/205 |
| | | | 345/420 |
| 2014/0340489 A1 | 11/2014 | Medioni et al. | |
| 2014/0368608 A1 | 12/2014 | Ishida | |
| 2015/0249794 A1 | 9/2015 | Furumura et al. | |
| 2015/0347615 A1* | 12/2015 | McGushion | G06F 17/30867 |
| | | | 715/234 |
| 2015/0363967 A1* | 12/2015 | Wells | G06T 15/20 |
| | | | 345/419 |
| 2016/0012855 A1* | 1/2016 | Krishnan | G11B 27/105 |
| | | | 386/241 |

OTHER PUBLICATIONS

YouTube 360 Video Player channel: https://www.youtube.com/channel/UCzuqhhs6NWbgTzMuM09WKDQ; accessed on Jul. 18, 2016; 2 pages.

Saba; Introducing 360 Video on Facebook; http://newsroom.fb.com/news/2015/09/introducing-360-video-on-facebook/; Sep. 23, 2015; 4 pages.

Kolor 360 video player: https://eyes.kolor.com/; accessed on Jul. 18, 2016; 2 pages.

Total Cinema 360: http://totalcinema360.com/software.html; accessed on Jul. 18, 2016; 2 pages.

Samsung 360 GearVR Trailer YouTube: https://www.youtube.com/watch?v=1_ifgJqLqTY; Published Mar. 25, 2015; accessed on Jul. 18, 2016; 3 pages.

* cited by examiner

SYSTEM AND METHOD FOR 360-DEGREE VIDEO NAVIGATION

CROSS-REFERENCE TO RELATED APPLICATION(S) AND CLAIM OF PRIORITY

This application claims priority under 35 U.S.C. § 119(e) to U.S. Provisional Patent Application No. 62/257,142 filed on Nov. 18, 2015, entitled "SYSTEM AND METHOD FOR 360 DEGREE VIDEO NAVIGATION." The content of the above-identified patent document is incorporated herein by reference.

TECHNICAL FIELD

This disclosure relates generally to display navigation in user equipment (UE). More specifically, this disclosure relates to 360-degree video touch based navigation.

BACKGROUND

When watching a 360-degree video on a UE or other mobile device or hand-held display, there are several ways to control which portion of the video a user watches. The user can control the video navigation by using the gyroscope, accelerometer, or compass in mobile device to turn the video. The user can also control the video navigation by dragging the screen to move the view of the video, or by using physical hardware buttons to rotate the direction user is watching at from inside of the 360-degree video. In many 360-degree video applications, the user has no way of knowing where in the 360-degree video they are when moving around with touch. There is also no way to jump to different positions, requiring a lot more "flicking" on the screen to get the 360-degree video to move around.

SUMMARY

Embodiments of the present disclosure provide 360-degree video touch based navigation.

In one example embodiment, a method is provided for navigating a 360-degree video. The method includes displaying a portion of the 360-degree video on a display. The method also includes displaying a graphical indicator overlaid on the 360-degree video. The graphical indicator represents a plurality of viewing directions within the 360-degree video. The graphical indicator includes at least one marker identifying a first viewing direction corresponding to the portion of the 360-degree video. The method also includes receiving an input at a position along the graphical indicator corresponding to a second viewing direction. The method also includes displaying another portion of the 360-degree video on the display, the other portion corresponding to the second viewing direction.

In another example embodiment, an apparatus is provided for navigating a 360-degree video. The apparatus includes a memory element configured to store the 360-degree video. The apparatus also includes at least one processor coupled to the memory element. The at least one processor is configured to display a portion of the 360-degree video on a display. The at least one processor is also configured to display a graphical indicator overlaid on the 360-degree video. The graphical indicator represents a plurality of viewing directions within the 360-degree video. The graphical indicator includes at least one marker identifying a first viewing direction corresponding to the portion of the 360-degree video. The at least one processor is also configured to receive an input at a position along the graphical indicator corresponding to a second viewing direction. The at least one processor is also configured to displaying another portion of the 360-degree video on the display, the other portion corresponding to the second viewing direction.

In yet another example embodiment, a non-transitory computer-readable medium is provided. The computer-readable medium comprises program code for navigating a 360-degree video. The program code, when executed by at least one processor, causes the electronic device to display a portion of the 360-degree video on a display. The program code, when executed by at least one processor, also causes the electronic device to display a graphical indicator overlaid on the 360-degree video. The graphical indicator represents a plurality of viewing directions within the 360-degree video. The graphical indicator includes at least one marker identifying a first viewing direction corresponding to the portion of the 360-degree video. The program code, when executed by at least one processor, also causes the electronic device to receive an input at a position along the graphical indicator corresponding to a second viewing direction. The program code, when executed by at least one processor, also causes the electronic device to display another portion of the 360-degree video on the display, the other portion corresponding to the second viewing direction.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
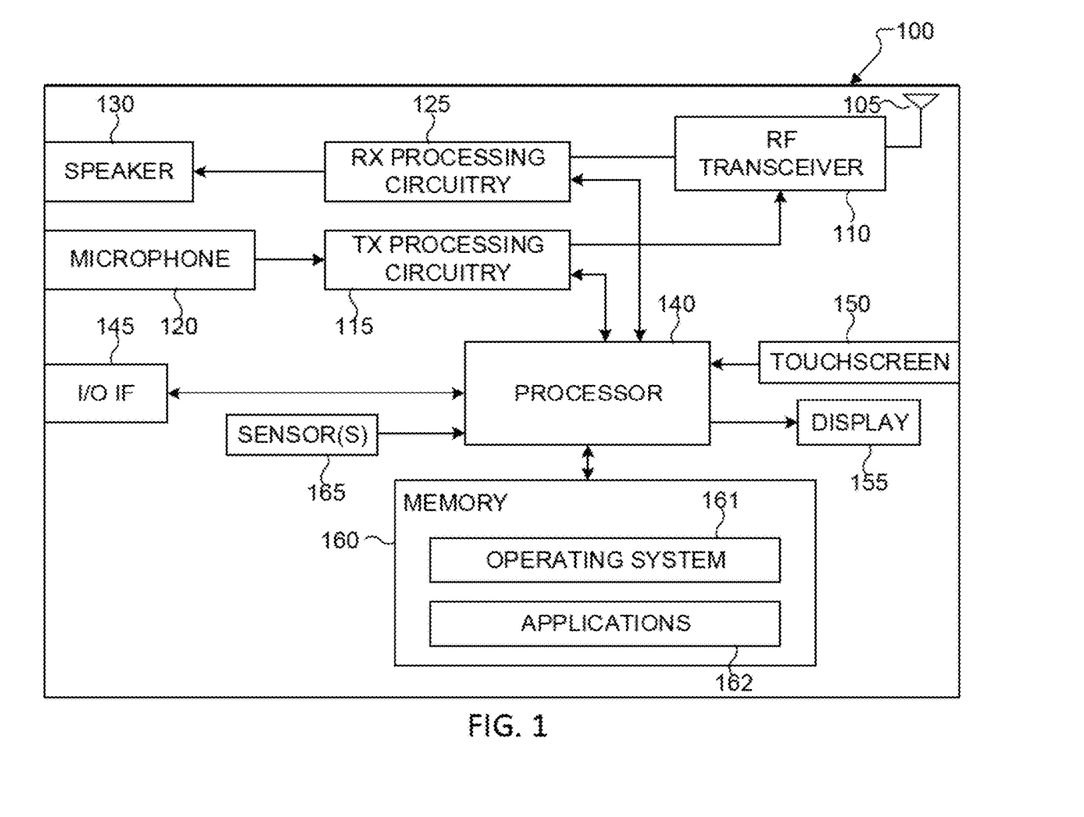
FIG. 1 illustrates user equipment (UE) in which one or more embodiments of the present disclosure may be implemented.

FIG. 1 illustrates user equipment (UE) 100 in which one or more embodiments of the present disclosure may be implemented. The embodiment of the UE 100 illustrated in FIG. 1 is for illustration only, the UE 100 comes in a wide variety of configurations, and FIG. 1 does not limit the scope of this disclosure to any particular implementation of a UE.

In various embodiments, the UE 100 may take different forms, and the present disclosure is not limited to any particular form. For example, the UE 100 may be a mobile communication device, such as, for example, a mobile station, head mountable display, a subscriber station, a wireless terminal, a smart phone, a tablet, etc., that is useable with 360-degree video, virtual reality (VR), and/or augmented reality (AR) applications. In other examples, the UE 100 may include a headset and take the form of a wearable electronic device, such as, for example, glasses, goggles, a helmet, etc., for the VR and/or AR applications.

As shown in FIG. 1, the UE 100 includes an antenna 105, a radio frequency (RF) transceiver 110, transmit (TX) processing circuitry 115, a microphone 120, and receive (RX) processing circuitry 125. The UE 100 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The RF transceiver 110 receives, from the antenna 105, an incoming RF signal transmitted by an access point (e.g., base station, WiFi router, Bluetooth device) for a network (e.g., a WiFi. Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The LX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the UE 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the UE 100 with the ability to connect to other devices, such as laptop computers and handheld computers. The I/O interface 145 is the communication path between these accessories and the processor 140.

The processor 140 is also coupled to the touchscreen 150 and the display 155. The operator of the UE 100 can use the touchscreen 150 to enter data and/or inputs into the UE 100.

The display 155 may be a liquid crystal display, light-emitting diode (LED) display, optical LED (OLED), active matrix OLED (AMOLED), or other display capable of rendering text and/or graphics, such as from websites, videos, games, etc.

The memory 160 is coupled to the processor 140. Part of the memory 160 could include a random access memory (RAM), and another part of the memory 160 could include a Flash memory or other read-only memory (ROM).

UE 100 further includes one or more sensors 165 that can meter a physical quantity or detect an activation state of the UE 100 and convert metered or detected information into an electrical signal. For example, sensor 165 may include one or more buttons for touch input, e.g., on the headset or the UE 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. The sensor(s) can be used to determine an orientation and facing direction of the UE for 360-degree video. Any of these sensor(s) 165 may be located within the UE 100, within a headset configured to hold the UE 100, or in both the headset and UE 100, for example, in embodiments where the UE 100 includes a headset.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity. As will be discussed in greater detail below, touchscreen 150 may be used to control a user interface (UI), detect UI inputs, etc.

As described in more detail below, the UE may include circuitry for and applications for providing a 360-degree video. Although FIG. 1 illustrates one example of UE 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the UE 100 configured as a mobile telephone, tablet, or smartphone, the UE 100 could be configured to operate as other types of mobile or stationary devices.

Embodiments of the present disclosure provide a UI for 360-degree video that allows users to navigate the video by quickly jumping to different angles of viewing a 360 video as well as know what direction the user is viewing within the video. As used herein, "jumping" can be defined as a direct transition from one portion of a 360-degree video to another portion of the 360-degree video without displaying any intervening portions of the 360-degree video.

In one or more embodiments of this disclosure, when the user touches the screen while viewing a 360 video, two spherically curved bars appear showing a horizontal degree and a vertical degree that the user is currently viewing. As used herein, these spherically curved bars can be referred to as indicators and may be presented in any number of shapes or sizes. When the user touches the indicators, the video jumps to that direction using, for example, absolute positioning. If the user touches, performs a gesture, or flicks anywhere on the video, but not on the indicators, the video is moved smoothly, for example, using relative positioning. The indicators allow the user to jump from one portion of the video to another portion of the video quickly, while also allowing users to move around slowly for various reasons, such as following objects in a 360-degree video. In one embodiment, the curved design of the indicators also gives the user a sense of the shape of the video. For example, curved indicators can represent a spherical shape of the video.

Figure 2:
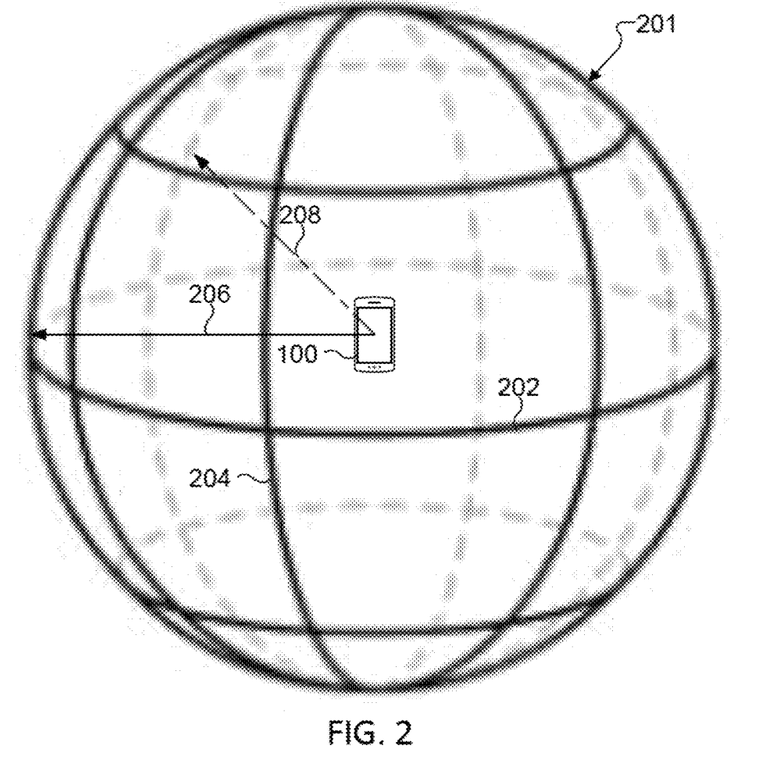
FIG. 2 illustrates a spherical representation of a 360-degree video in accordance with an embodiment of this disclosure.

FIG. 2 illustrates a 360-degree video 201 in accordance with an embodiment of this disclosure. The embodiment of the 360-degree video illustrated in FIG. 2 is for illustration only. A 360-degree video can come in a wide variety of configurations, and FIG. 2 does not limit the scope of this disclosure to any particular implementation of a 360-degree video.

In FIG. 2, a sphere represents the 360-degree video 201. The 360-degree video 201 can include a plurality of portions of video that when combined, create the 360-degree video 201. 360-degree video 201 includes horizontal 202 and vertical 204 lines for illustration purposes to show the stitching of the different portions of the 360-degree video 201. In an embodiment of this disclosure, a UE 100 is illustratively positioned at the center of the 360-degree video 201. When using the UE 100 in a hand-held manner, portions of the 360-degree video can be displayed in the UE 100 and the user can cause movement of the 360-degree video 201 to show different portions of the 360-degree video 201.

In one or more embodiments of this disclosure, the UE 100 includes a reference direction 206. In one embodiment, the reference direction 206 can be identified by being zero degrees along a horizontal plane and zero degrees in a vertical plane. All other directions, such as direction 208, can be identified with respect to the reference direction 206. For example, graphical indicators on a display can indicate vertical and horizontal angles from the reference direction 206. In this example, direction 208 can be roughly 45 degrees in a vertical direction and −45 degrees in a horizontal direction compared to reference direction 206. By changing directions within 360-degree video 201, a user can view different portions of the 360-degree video.

Figure 3:
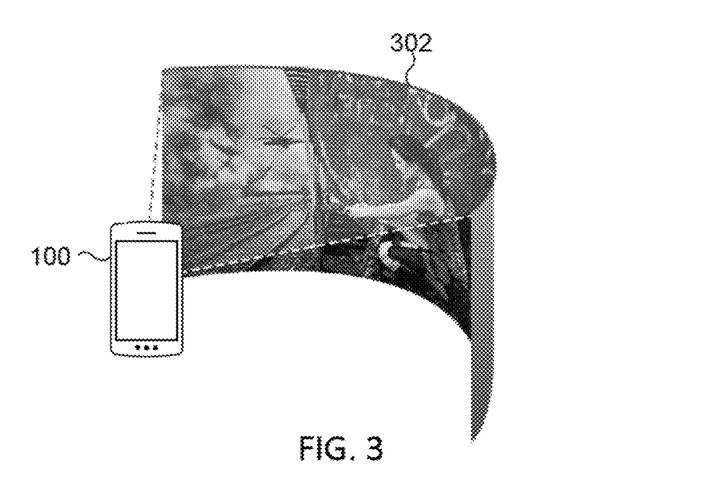
FIG. 3 illustrates a viewing angle in a 360-degree video in accordance with an embodiment of this disclosure.

FIG. 3 illustrates a viewing angle in a 360-degree video in accordance with an embodiment of this disclosure. In FIG. 3, in an embodiment of this disclosure, a display of a UE can display or render only a portion 302 of a 360-degree video. The viewing angle can be set based on a size of a display or video content. In an embodiment of this disclosure, the direction of the UE within the 360-degree video can be identified as being towards the center of the portion 302. In other embodiments, the direction can be based on another location of the portion of the 360-degree video.

Figure 4:
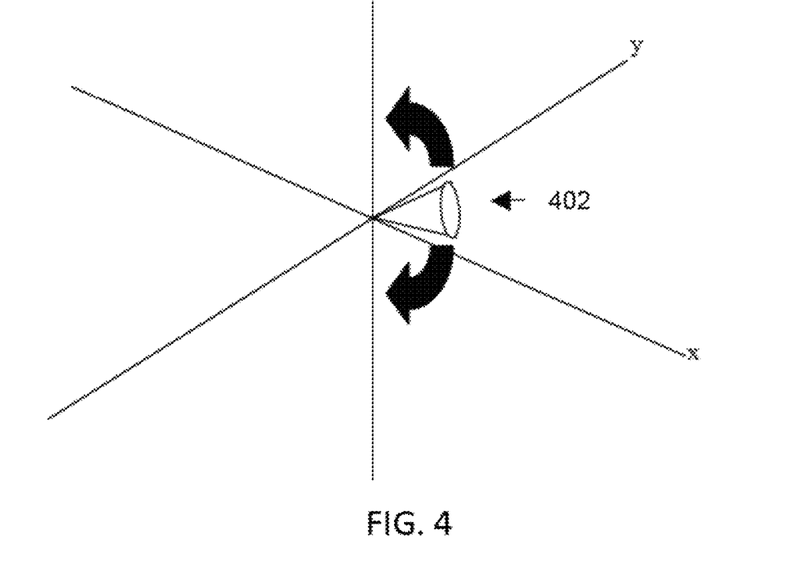
FIG. 4 illustrates an exemplary representation, in three-dimensional space, of an adjustment of the viewing direction in a vertical direction in accordance with an embodiment of this disclosure.

FIG. 4 illustrates an exemplary representation, in three-dimensional space, of an adjustment of the viewing direction in a vertical direction in accordance with an embodiment of this disclosure. The vertical viewing direction 402 can be adjusted over a range of 180 degrees vertically. The viewing direction is the perspective view of the content that is shown from an origin point. In FIG. 4, the vertical viewing direction 402 can be represented by −90 degrees to 90 degrees along the z-axis (assuming a Cartesian coordinate system with the x direction generally denoting left/right or yaw, the y direction generally denoting forward/backwards, and the z direction generally denoting up/down or pitch).

Figure 5:
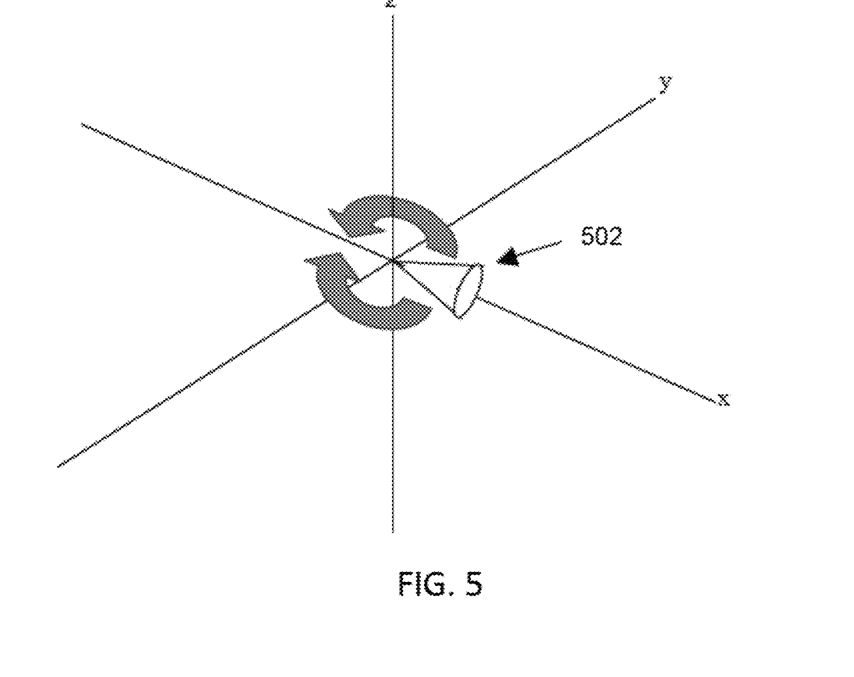
FIG. 5 illustrates an exemplary representation, in three-dimensional space, of an adjustment of the viewing direction in a horizontal direction in accordance with an embodiment of this disclosure.

FIG. 5 illustrates an exemplary representation, in three-dimensional space, of an adjustment of the viewing direction in a horizontal direction in accordance with an embodiment of this disclosure. The horizontal viewing direction 502 can be adjusted over a range of 360 degrees horizontally. In FIG. 5, the horizontal viewing direction 502 can be represented by −180 degrees to 180 degrees around the z-axis (i.e., in plane with the xy-plane).

Figure 6:
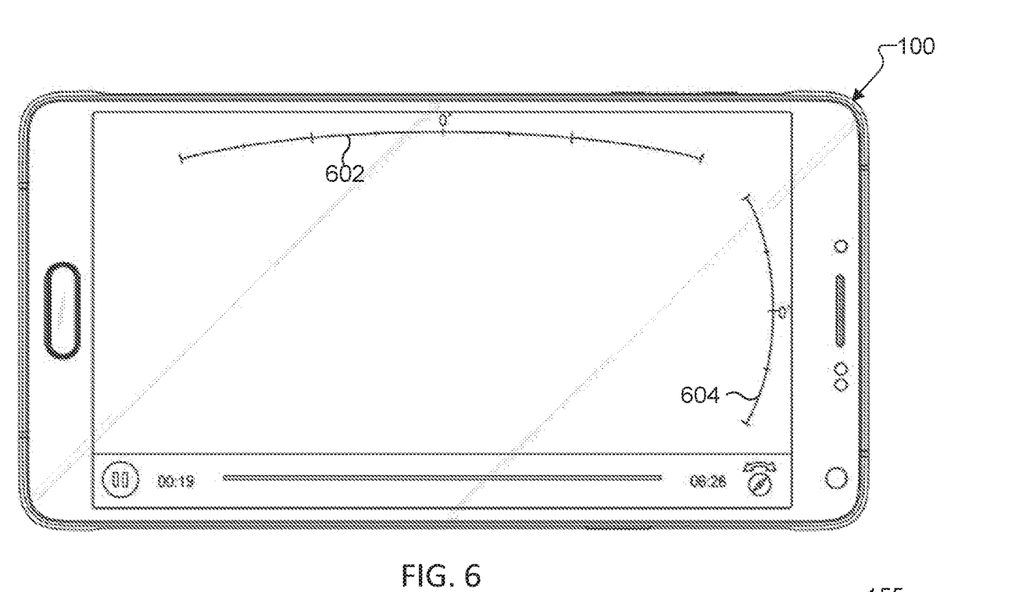
FIG. 6 illustrates a UE 100 with indicators overlaid on a display in accordance with an embodiment of this disclosure.

FIG. 6 illustrates a UE 100 with indicators overlaid on a display in accordance with an embodiment of this disclosure. The embodiment of the UE 100 illustrated in FIG. 6 is for illustration only. A UE can come in a wide variety of configurations, and FIG. 6 does not limit the scope of this disclosure to any particular implementation of a UE.

In FIG. 6, a 360-degree video may include graphical indicators, as part of a graphical user interface (GUI), with intractable elements. The graphical indicators can include navigation bars 602 and 604, for horizontal and vertical navigation of the 360-degree video of the UE 100. The graphical indicators may be an overlay, embedded, or otherwise positioned with respect to the media in a way such that a user may interact with the graphical indicators. Such interaction could be through touch (e.g., a touchscreen), a cursor, buttons, dials, remote motion gestures (e.g., detected by a camera, capacitive sensors, etc.), or other interaction input. The graphical indicators may take the form of a relatively horizontal bar 602 and/or vertical bar 604. The bars 602 and 604 may represent degrees from a reference direction (e.g., zero degrees horizontal and zero degrees vertical). In one embodiment, the horizontal bar 602 may encompass a 360-degree range, (e.g., from −180 degrees to 180 degrees) and the vertical bar 604 may encompass a 180-degree range (e.g., from −90 degrees to 90 degrees).

Figure 7:
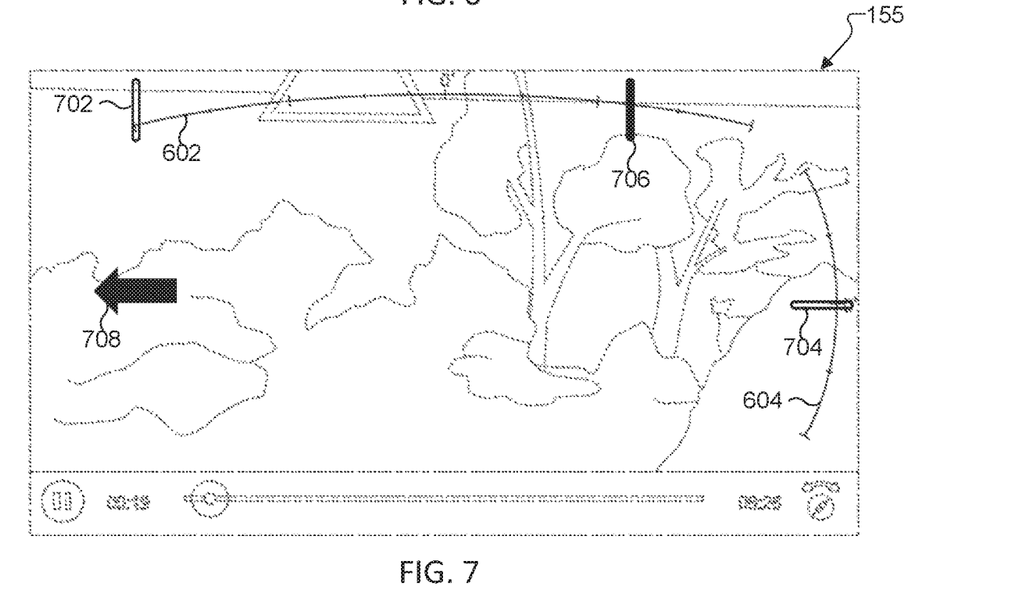
FIG. 7 illustrates a display with markers in accordance with an embodiment of this disclosure.

FIG. 7 illustrates a display 155 with markers 702 and 704 in accordance with an embodiment of this disclosure. The embodiment of the display 155 illustrated in FIG. 6 is for illustration only. A display can come in a wide variety of configurations, and FIG. 6 does not limit the scope of this disclosure to any particular implementation of a display.

In FIG. 7, the navigation bars 602 and 604 may optionally have relative markers 702 and 704 to show degrees away from the reference as exemplified by the hash marks. The GUI may include markers 702 and 704 on the bars 602 and 604 to show the current viewing direction relative to the reference direction, as shown by the semi-transparent bars. Other indicator representations in various shapes may be utilized (e.g., circles, squares, arrows, triangles, etc.).

The graphical indicators of the GUI overlay may respond to input such as a drag of the markers 702 and 704 along the bars 602 and 604 to adjust the viewing direction of the content. Additionally, the display 155 may jump from one viewing direction based on received input at a contact point on one of bars 602 and 604 to another viewing direction. For example if the viewing direction was oriented in the reference view of zero degrees horizontal and vertical, receiving input at the far left point of the horizontal bar can jump the viewing direction to −180 degrees.

The GUI may also respond to content viewing direction manipulations that are not directly on the bars 602 and 604. For example, a received dragging input (e.g., through touch on a screen, a cursor, mouse lock, etc.) can move the viewing direction. The markers 702 and 704 on the respective bars 602 and 604 may be adjusted concurrently with the viewing direction manipulation to indicate position relative to the reference direction. In different embodiments, a viewing direction can be controlled by the gyroscope, accelerometer, and compass, or by using physical hardware buttons to rotate the viewing angle (look vector/direction).

In one or more embodiments, the markers 702 and 704 showing the position on the bars 602 and 604 may fade out after a period of inactivity and reappear when additional input is provided. The marker on a navigation bar that is not currently being adjusted may also temporarily fade out while the input is for the other bar.

In different embodiments, a point of interest markers, such as a navigation marker 706 or arrow 708 may also be displayed on the GUI. The points of interest markers can be bookmarks. A bookmark can be set by a user or previously defined by the video. For example, when a user identifies a scene or location that the user finds interesting, the user can set a bookmark. The bookmark can then display on the graphical indicator or elsewhere on the video. In another example, a data track in the video can include timing and duration of different points of interest.

In one example, a point of interest can be an object in the video. In this example, the navigation marker 706 can move along the navigation bars 602 and 604 to show the location of the object within the video. As shown in FIG. 7, the navigation marker 706 is of similar size and shape to markers 702 and 704. However, in different embodiments, the navigation marker 706 can be of a different color, size, or shape. For example, the navigation marker 706 can be a shape that can imply the object that the navigation marker 706 is tracking, such as a circle or ball graphic to show the location of a soccer ball.

In yet further embodiments, the user can be guided to a point of interest through the use of an arrow 708. The arrow 708 can guide a user to a viewing position to view a scene or directly to the interesting object. For example, the arrow 708 can guide a user to a hotspot for a best viewing position of a scene that is about to be played. In another example, the hotspot itself may be the arrow 708. Arrows can be of different shape, colors, and sizes. Similar to the navigation marker 706, the arrow 708 can be a shape that can imply an object that the arrow is directing the user, such as a circle or ball graphic to show the location of a soccer ball.

Figure 8:
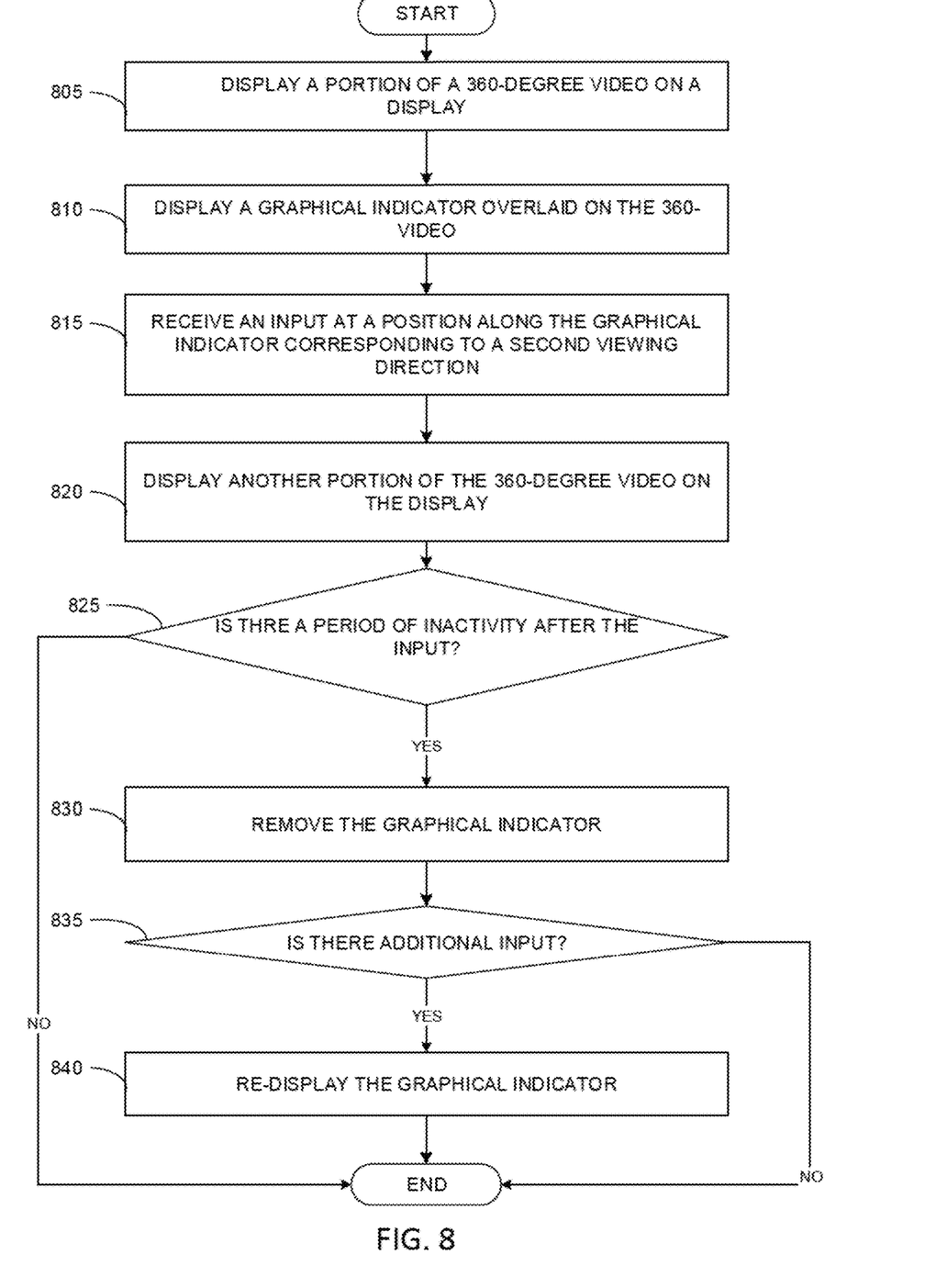
FIG. 8 illustrates a process for navigating a 360-degree video according to embodiments of the present disclosure.

FIG. 8 illustrates a process 800 for navigating a 360-degree video according to embodiments of the present disclosure. The process 800 depicted in FIG. 8 may be performed by the UE 100 or different components of the UE 100 in FIG. 1.

At step 805, the process 800 begins with the UE 100 displaying a portion of the 360-degree video on a display. For example, in step 805, the UE 100 may be a display for a mobile communication device, such as, for example, a smart phone or tablet. In one embodiment, the UE 100 may not be mountable, or be mountable but not used in that manner. In another embodiment, the UE is mountable in a headset, such as, for example, a Gear$^{VR}$® headset, to provide a head-mounted display experience. In other examples, the UE 100 may itself be both a headset and display for both VR and AR applications.

At step 810, the UE 100 displays a graphical indicator overlaid on the 360-degree video. The graphical indicator represents a plurality of viewing directions within the 360-degree video. The graphical indicator includes at least one marker identifying a first viewing direction corresponding to the portion of the 360-degree video. In step 810, the displaying the graphical indicator overlaid on the 360-degree video may include displaying a first navigation bar, for navigation in a vertical direction, overlaid on the 360-degree video and a second navigation bar, for navigation in a horizontal direction. In an embodiment, the first navigation bar includes a first marker of the at least one marker and the second navigation bar includes a second marker of the at least one marker. In this embodiment, the first navigation bar can also include a range of 180 degrees and the second navigation bar includes a range of 360 degrees. The marker identifies the first viewing direction on the graphical indicator compared to a reference viewing direction.

At step 815, the UE 100 receives an input at a position along the graphical indicator corresponding to a second viewing direction. For example, the UE 100 can receive a touch input at the position. In one example embodiment, the touch input is on a marker and the touch input itself is a dragging gesture to move the marker along the graphical indicator (or navigation bar). In this example, the second viewing direction is changing along with the adjusted marker. In another example, the second viewing direction does not change until adjustment of the marker is complete and the second viewing direction corresponds to the final position of the marker. In yet another example, the touch input is a single touch to a position along the graphical indicator. In this example, the second viewing direction transitions from the first viewing direction by jumping to the portion of the 360-degree video that corresponds to the new marker position along the graphical indicator.

In one example embodiment, the plurality of viewing directions allows for directly transitioning from the first viewing direction to any portion of the 360-degree video. For example, the user can directly transition from any one portion of the 360-degree video to any other portion of the 360-degree video without displaying any of the intervening portions of the 360-degree video. In this example, the intervening portions can be portions of the video that would be displayed if the user were to use a drag touch input and move a marker from one position to another. That is, the portions of the video that exist in the 360-degree video between the starting portion corresponding to a first viewing direction and the final portion corresponding to the second viewing direction.

At step 820, the UE 100 displays another portion of the 360-degree video on the display. The other portion corresponds to the second viewing direction. In an example embodiment of this disclosure, when the UE 100 receives another touch input moving the displayed portion of the 360 degree video to a third viewing direction, the UE 100 adjusts the at least one marker to correspond with the third viewing direction. For example, if the user performs a touch input on the display, but not on the graphical indicator or marker, and the touch input causes the 360-degree video to display a different portion, then the marker on the graphical indicator can be adjusted to represent a viewing direction of the different portion.

At step 825, the UE 100 determines whether there is a period of inactivity after the input. In one example, period of inactivity could be a touch input on the graphical indicator, a dragging input, or both. The period of inactivity can be user set, predetermined, or dynamically set based on a number of factors including the application, video, and past user history. At step 830, the UE 100 can remove the graphical indicator from the 360-degree video. The graphical indicator can be faded out or removed, completely or partially. When faded out, the graphical indicator may obtain a level of transparency.

At step 835, the UE 100 determines whether an additional input is received. This additional input can be the type of input monitored in step 825, or could include additional inputs. At step 840, the UE 100 can re-display the graphical indicator overlaid on the 360-degree video. In other words, once the graphical indicator is removed from the display based on the period of inactivity, when there is additionally user input, the UE 100 can re-display the graphical indicator.

Although FIG. 8 illustrates an example process for navigating a 360-degree video, various changes could be made to FIG. 8. For example, while shown as a series of steps, various steps in each figure could overlap, occur in parallel, occur in a different order, or occur multiple times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for navigating a 360-degree video, the method comprising:
    displaying, on a display of an electronic device, a portion of the 360-degree video corresponding to a first viewing direction and a graphical indicator overlaid on the portion of the 360-degree video, the graphical indicator representing a plurality of viewing directions within the 360-degree video, the graphical indicator including a first navigation bar for navigation in a vertical direction and a second navigation bar for navigation in a horizontal direction, wherein the second navigation bar is longer than the first navigation bar;
    displaying a first marker at a location on the first navigation bar corresponding to a vertical distance that the first viewing direction is from a reference viewing direction within the 360-degree video, a second marker at a location on the second navigation bar corresponding to a horizontal distance that the first viewing direction is from the reference viewing direction, and a third marker on at least one of the first navigation bar or the second navigation bar, the third marker indicating a point of interest (POI) within the 360-degree video;
    receiving an input at a position on the first navigation bar or the second navigation bar that is different than the location of the first marker or the second marker;

when the input is received on the first navigation bar, displaying a second viewing direction based on the vertical distance between the input and the reference viewing direction;

when the input is received on the second navigation bar, displaying the second viewing direction based on the horizontal distance between the input and the reference viewing direction; and when the input is received on the third marker, displaying the second viewing direction including the POI.

2. The method of claim 1, wherein:
the first navigation bar represents 180 degrees in the vertical direction, and
the second navigation bar represents 360 degrees in the horizontal direction.

3. The method of claim 1, further comprising:
responsive to identifying a period of inactivity after the input, removing the graphical indicator from the 360-degree video; and
responsive to receiving an additional input after the period of inactivity, displaying the graphical indicator overlaid on the 360-degree video.

4. The method of claim 1, further comprising:
in response to displaying the second viewing direction in the 360-degree video adjusting the location of the first marker or the second marker to correspond with the second viewing direction in the 360-degree video.

5. The method of claim 1, further comprising:
displaying, on the display, the second viewing direction independent of an orientation of the electronic device,
wherein the first viewing direction is determined based on the orientation of the electronic device,
wherein the orientation of the electronic device is determined based on the input detected by a sensor of the electronic device,
wherein the plurality of viewing directions allows for directly transitioning, independently of the orientation of the electronic device, from the first viewing direction to any portion of the 360-degree video.

6. The method of claim 1, wherein the reference viewing direction is zero degrees along a horizontal plane and zero degrees along a vertical plane of the 360-degree video.

7. An apparatus for navigating a 360-degree video, the apparatus comprising:
a memory element configured to store the 360-degree video; and
at least one processor coupled to the memory element, the at least one processor configured to:
display, on a display of the apparatus, a portion of the 360-degree video corresponding to a first viewing direction and a graphical indicator overlaid on the portion of the 360-degree video, the graphical indicator representing a plurality of viewing directions within the 360-degree video, the graphical indicator including a first navigation bar for navigation in a vertical direction and a second navigation bar for navigation in a horizontal direction, wherein the second navigation bar is longer than the first navigation bar;
display a first marker at a location on the first navigation bar corresponding to a vertical distance that the first viewing direction is from a reference viewing direction within the 360-degree video, a second marker at a location on the second navigation bar corresponding to a horizontal distance that the first viewing direction is from the reference viewing direction, and a third marker on at least one of the first navigation bar or the second navigation bar, the third marker indicating a point of interest (POI) within the 360-degree video;
receive an input at a position on the first navigation bar or the second navigation bar that is different than the location of the first marker or the second marker;
when the input is received on the first navigation bar, display a second viewing direction based on the vertical distance between the input and the reference viewing direction;
when the input is received on the second navigation bar, displaying the second viewing direction based on the horizontal distance between the input and the reference viewing direction; and
when the input is received on the third marker, display the second viewing direction including the POI.

8. The apparatus of claim 7, wherein:
the first navigation bar represents 180 degrees in the vertical direction, and
the second navigation bar represents 360 degrees in the horizontal direction.

9. The apparatus of claim 7, wherein the at least one processor is further configured to:
responsive to identifying a period of inactivity after the input, remove the graphical indicator from the 360-degree video; and
responsive to receiving an additional input after the period of inactivity, display the graphical indicator overlaid on the 360-degree video.

10. The apparatus of claim 7, wherein the at least one processor is further configured to:
in response to displaying the second viewing direction in the 360-degree video adjust the location of the first marker or the second marker to correspond with the second viewing direction in the 360-degree video.

11. The apparatus of claim 7, wherein the at least one processor is further configured to:
display, on the display, the second viewing direction independent of an orientation of the apparatus,
wherein the first viewing direction is determined based on the orientation of the apparatus,
wherein the orientation of the apparatus is determined based on the input detected by a sensor of the apparatus,
wherein the plurality of viewing directions allows for directly transitioning, independently of the orientation of the apparatus, from the first viewing direction to any portion of the 360-degree video.

12. The apparatus of claim 7, wherein the reference viewing direction is zero degrees along a horizontal plane and zero degrees along a vertical plane of the 360-degree video.

13. A non-transitory computer-readable medium comprising program code for navigating a 360-degree video that, when executed by at least one processor, causes an electronic device to:
display, on a display of the electronic device, a portion of the 360-degree video corresponding to a first viewing direction and a graphical indicator overlaid on the portion of the 360-degree video, the graphical indicator representing a plurality of viewing directions within the 360-degree video, the graphical indicator including a first navigation bar for navigation in a vertical direction and a second navigation bar for navigation in a horizontal direction, wherein the second navigation bar is longer than the first navigation bar;

display a first marker at a location on the first navigation bar corresponding to a vertical distance that the first viewing direction is from a reference viewing direction within the 360-degree video, a second marker at a location on the second navigation bar corresponding to a horizontal distance that the first viewing direction is from the reference viewing direction, and a third marker on at least one of the first navigation bar or the second navigation bar, the third marker indicating a point of interest (POI) within the 360-degree video;

receive an input at a position on the first navigation bar or the second navigation bar that is different than the location of the first marker or the second marker;

when the input is received on the first navigation bar, display a second viewing direction based on the vertical distance between the input and the reference viewing direction;

when the input is received on the second navigation bar, displaying the second viewing direction based on the horizontal distance between the input and the reference viewing direction; and when the input is received on the third marker, display the second viewing direction including the POI.

14. The non-transitory computer-readable medium of claim 13, wherein:
the first navigation bar represents 180 degrees in the vertical direction, and
the second navigation bar represents 360 degrees in the horizontal direction.

15. The non-transitory computer-readable medium of claim 13, further comprising program code that, when executed by the at least one processor, causes the electronic device to:

responsive to identifying a period of inactivity after the input, remove the graphical indicator from the 360-degree video; and responsive to receiving an additional input after the period of inactivity, display the graphical indicator overlaid on the 360-degree video.

16. The non-transitory computer-readable medium of claim 13, further comprising program code that, when executed by the at least one processor, causes the electronic device to:

in response to displaying the second viewing direction in the 360-degree video adjust the location of the first marker or the second marker to correspond with the second viewing direction in the 360-degree video.

17. The non-transitory computer-readable medium of claim 13, further comprising program code that, when executed by the at least one processor, causes the electronic device to:

display, on the display, the second viewing direction independent of an orientation of the electronic device, wherein the first viewing direction is determined based on the orientation of the electronic device, wherein the orientation of the electronic device is determined based on the input detected by a sensor of the electronic device, wherein the plurality of viewing directions allows for directly transitioning, independently of the orientation of the electronic device, from the first viewing direction to any portion of the 360-degree video.

* * * * *